United States Patent [19]

Mowbray

[11] 4,353,336

[45] Oct. 12, 1982

[54] FUEL PUMPING APPARATUS

[75] Inventor: Dorian F. Mowbray, Burnham, England

[73] Assignee: Lucas Industries Limited, Birmingham, England

[21] Appl. No.: 209,602

[22] Filed: Nov. 24, 1980

[30] Foreign Application Priority Data

Jan. 10, 1980 [GB] United Kingdom ............... 8000846

[51] Int. Cl.³ .................... F02B 77/00; B60R 25/04
[52] U.S. Cl. ........................... 123/198 B; 123/466; 123/365; 417/462; 180/287
[58] Field of Search ............ 123/198 B, 466, 365; 417/462, 313, 253; 180/287

[56] References Cited

U.S. PATENT DOCUMENTS

| 3,452,732 | 7/1969 | Johanson | 123/198 B |
| 3,782,493 | 1/1974 | Lipshutz et al. | 123/198 B |
| 3,782,862 | 1/1974 | Cammi | 123/198 B |
| 4,056,089 | 11/1977 | Ratloff | 123/198 B |
| 4,098,249 | 7/1978 | Mowbray | 417/462 |

Primary Examiner—Ira S. Lazarus

[57] ABSTRACT

A fuel pumping apparatus includes a slide member which can be engaged with an arm of a throttle which controls the flow of fuel to an injection pump of the apparatus. The slide is moveable by an operator to cut off the supply of fuel to the associated engine. A tumbler lock mechanism is mounted in a housing of the apparatus and is connected to an arm which can engage a production on the slide member to move and/or retain the slide member to the position in which supply of fuel to the engine is prevented.

4 Claims, 4 Drawing Figures

FUEL PUMPING APPARATUS

This invention relates to fuel pumping apparatus for supplying fuel to a compression ignition internal combustion engine and of the kind comprising an injection pump operable in use, in timed relationship with an associated engine, an angularly adjustable throttle member mounted in a housing of the apparatus, the angular setting of said throttle member determining the amount of fuel supplied to the injection pump during a filling stroke thereof, a governor mechanism coupled to said throttle member, said governor mechanism including a manually movable member operable in use to vary the speed of the associated engine, a radial arm on said throttle member, a slide member movable into engagement with said radial arm to move the throttle member angularly to a closed position at which no fuel is supplied to the injection pump, a manually operable member engageable with said slide member to effect movement of the throttle member to the closed position, and a cover mounting said manually operable and manually movable members, said cover defining with the housing a space in which is located said slide member.

Such pumps are well known in the fuel pumping apparatus art, the manually operable member being connected by a linkage or cable to a stop control knob operable by the driver of a vehicle powered by the engine, when it is required to stop the engine. It is required to provide a lock whereby the throttle member can be locked in the closed position thereby to prevent the engine being started. It would be a comparatively easy task to provide a lock mechanism associated with the stop control knob, but the effect of such a lock mechanism could be readily overcome by disconnecting the linkage or severing the cable. It is therefore necessary to provide the lock mechanism as a part of the apparatus whilst at the same time retaining the facility for the engine to be stopped using the stop control knob.

The object of the present invention is to provide an apparatus of the kind set forth in a form in which the aforesaid requirements are met.

According to the invention an apparatus of the kind set forth comprises a lock mechanism mounted on said cover, a radial arm projecting from said lock mechanism and movable angularly when the lock mechanism is operated and a projection on said slide member for engagement by said radial arm whereby the movement of the lock mechanism to the locking position will move and/or retain said slide member in the position in which the throttle member is in the closed position.

An example of an apparatus in accordance with the invention will now be described with reference to the accompanying drawings in which.

Figure 1:
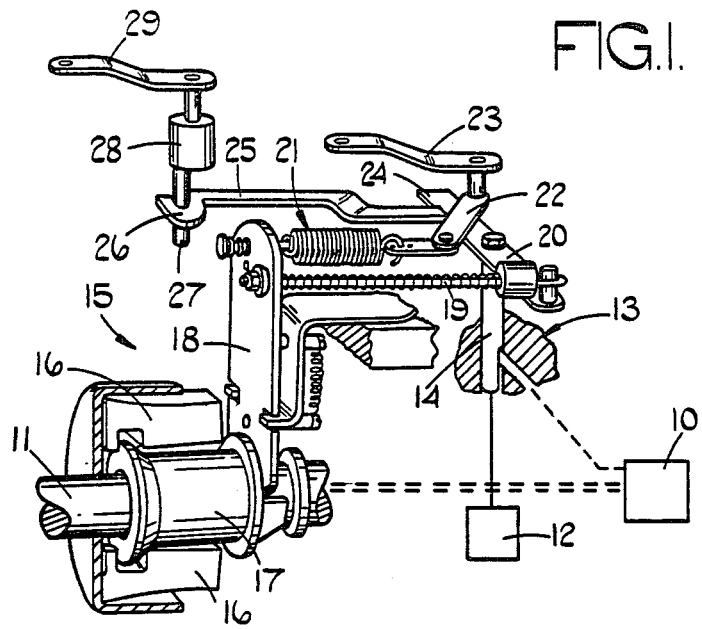
FIG. 1 is a diagrammatic illustration of a known form of pumping apparatus.

Referring to the drawings the apparatus comprises a rotary distributor injection pump which is diagrammatically shown at 10 and which is driven by means of a drive shaft 11. Fuel is supplied to the injection pump by means of a supply pump 12 and the quantity of fuel supplied to the injection pump is regulated by means of a throttle generally indicated at 13. The throttle comprises an angularly movable throttle member 14 located within a bore formed in the housing of the apparatus, the throttle member having an axial slot for variable register with a passage connected to the injection pump.

The apparatus also includes a governor mechanism and this is generally indicated at 15 and includes a plurality of governor weights 16 which are mounted in a cage about the shaft 11. The cage is driven by the shaft and as the weights move outwardly they impart movement to a sleeve 17 carried about the shaft. The sleeve engages one end of a pivotal lever 18 the other end of the lever being connected by a link 19 to a radial arm 20 connected to the throttle member 14. As the weights move outwardly, the lever 18 will move in the anticlockwise direction thereby moving the throttle member in a direction to reduce the amount of fuel supplied to the injection pump.

The movement of the lever 18 under the action of the weights is opposed by a governor spring 21, one end of which is connected to the lever, the other end of which is connected to an arm 22 angularly movable by means of a manually movable member 23 which is connected, in use, to the throttle pedal of the vehicle driven by the engine. As the force exerted by the spring 21 is increased, the governed speed of the engine will increase.

In order to stop the associated engine it is necessary to cut off the supply of fuel and for this purpose there is provided a further radial arm 24 on the throttle member and which is positioned to be engaged by the end of a cranked slide member 25. At its end remote from the arm 24, the slide member is provided with a hook like portion 26, in which is engaged a pin 27 eccentrically disposed at the end of an angularly movable shaft 28. The shaft 28 is journalled in a cover attached to the apparatus as also is the shaft which connects the arms 22 and 23. The shaft 28 and the pin 27 constitute a manually operable member which can be moved by the driver of the vehicle when it is required to stop the engine. For this purpose the shaft is provided with an arm 29 connected to a stop control operable by the driver, by way of a linkage or a Bowden cable. When the shaft 28 is rotated the hook 26 will be moved towards the right as seen in FIG. 1, such movement being imparted to the slide member 25 and the latter engaging the arm 24 to move the throttle member 14 to the closed position thereby preventing further supply of fuel to the engine. A yieldable connection is provided between the arm 20 and the rod 19 so that the throttle member can move independently of the rod 19 if such is necessary.

Figure 2:
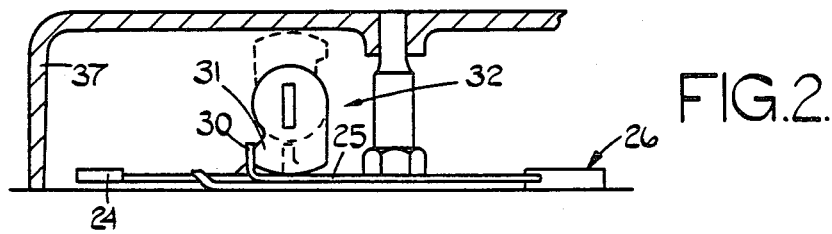
FIG. 2 is a side elevation showing the modification necessary to the known apparatus.
Figure 3:
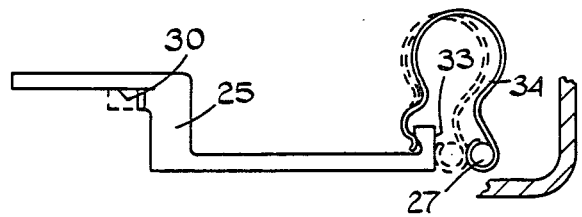
FIG. 3 is a plan view of the modification.

In order to lock the throttle member 14 in the closed position the slide member as seen in FIGS. 2 and 3, is provided with an upstanding projection 30 intermediate its ends. The projection 30 is positioned to be engageable by a radial arm 31 movable by a lock mechanism which is generally indicated at 32 in FIG. 4. In FIG. 2 the arm is shown in the locked position and it will be seen to be engaged with the projection 30 and the end of the slide member 25 will be engaged with the arm 24 to retain the throttle member in the closed position. The arm 31 is movable to the dotted position shown in FIG. 2 in which position it lies out of the path of movement of the projection 30. As shown in FIG. 3, the hook member 26 is omitted and the pin 27 is biassed into engagement with an abutment face 33 defined by the slide member 25, by means of a hair pin spring 34. The spring can yield as shown in full outline, to allow the lock mechanism to be operated without the resulting movement of the slide member as a result of operation of the lock mechanism, effecting movement of the pin and the shaft 28.

Figure 4:
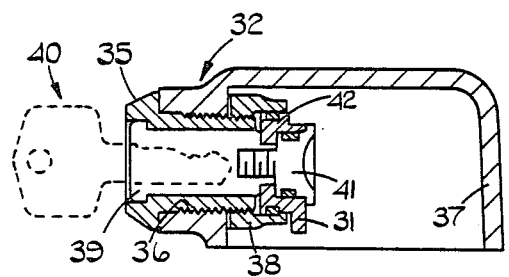
FIG. 4 is an end elevation.

Turning now to FIG. 4 the lock mechanism 32 comprises a flanged body portion 35 which is mounted within an aperture 36 formed in a boss which is integral with a cover 37 secured to the housing of the apparatus. The cover defines a chamber into which extends the throttle member, and in which is located the slide member. This chamber will, in use, contain fuel and a sealing washer is provided between a retaining nut 38 and the interior surface of the cover.

Formed in the body portion 35 is a cylindrical bore having an enlarged opening, the bore accommodating a lock barrel 39 having a front opening for a key which is indicated in dotted outline at 40. The barrel at its inner end, is provided with a threaded recess to receive a retaining screw 41. The screw 41 has a head portion which engages a circular boss 42 to retain the boss against a step defined on the surface of the projecting portion of the lock barrel. The boss 42 moves angularly with the barrel and the arm 31 is integrally formed with the boss. In order to prevent fuel escaping through the lock mechanism, the head of the screw is provided with a circumferential groove which accommodates an "O" ring and the boss has a similar groove to accommodate a further "O" ring which is in sealing engagement with the internal surface of a hollow cylindrical extension of the nut 38. It should be noted that the axis of angular movement of the barrel is at right angles to the direction of movement of the slide member 25.

The lock mechanism is of the pin-tumbler type and it may be of the kind wherein the key is removable at one angular position of the barrel only. If this is the case then the key is obviously removable only in the locked position of the mechanism when the throttle member has been moved to the closed position. When the lock mechanism is moved to the unlocked position, means not shown would be provided to retain the barrel at this position to ensure that the arm could not rotate and possibly interfere with the action of the slide member 25. Alternatively, the lock mechanism may be of the type in which the key is removable at two angular settings of the barrel and in this case the barrel would be automatically held by the pins of the lock mechanism.

I claim:

1. A fuel pumping apparatus for supplying fuel to a compression ignition internal combustion engine and comprising an injection pump operable in use, in timed relationship with an associated engine, an angularly adjustable throttle member mounted in a housing of the appratus, the angular setting of said throttle member determining the amount of fuel supplied to the injection pump during a filling stroke thereof, a governor mechanism coupled to said throttle member, said governor mechanism including a manually movable member operable in use to vary the speed of the associated engine, a radial arm on said throttle member, a slide member movable into engagement with said radial arm to move the throttle member angularly to a closed position at which no fuel is supplied to the injection pump, a manually operable member engageable with said slide member to effect movement of the throttle member to the closed position, and a cover mounting said manually operable and manually movable members, said cover defining with the housing a space in which is located said slide member, a lock mechanism mounted on said cover, a radial arm projecting from said lock mechanism and movable angularly when the lock mechanism is operated and a projection on said slide member for engagement by said radial arm whereby the movement of the lock mechanism to the locking position will move and/or retain said slide member in the position in which the throttle member is in the closed position.

2. An apparatus according to claim 1 including resilient means acting intermediate said slide member and said manually operable member, said resilient means acting to allow movement of the slide member by the lock mechanism in-respective of the setting of the manually operable member.

3. An apparatus according to claim 1 or 2 in which said lock mechanism comprises a flanged body portion which is retained within an aperture in the housing, a retaining nut engaged with the body portion and a sealing washer to prevent escape of liquid from the housing between the aperture and the body portion, a lock barrel located in a bore in the body portion, said barrel having an aperture for the reception of a key, a retaining screw engaged with the inner end of the barrel to retain a boss relative to the barrel, said retaining nut defining a hollow cylindrical extension, sealing means carried by the boss and co-operating with the internal surface of said extension, further sealing means acting between the retaining screw and the boss, said sealing means acting to prevent escape of liquid into the lock barrel, said radial arm being secured to or formed integrally with said boss.

4. An apparatus according to claim 2 in which said resilient means comprises a main pin spring which biases said manually operable member into contact with said slide member, said spring yielding to allow separation of the slide member and the manually operable member.

* * * * *